Patented Sept. 28, 1926.

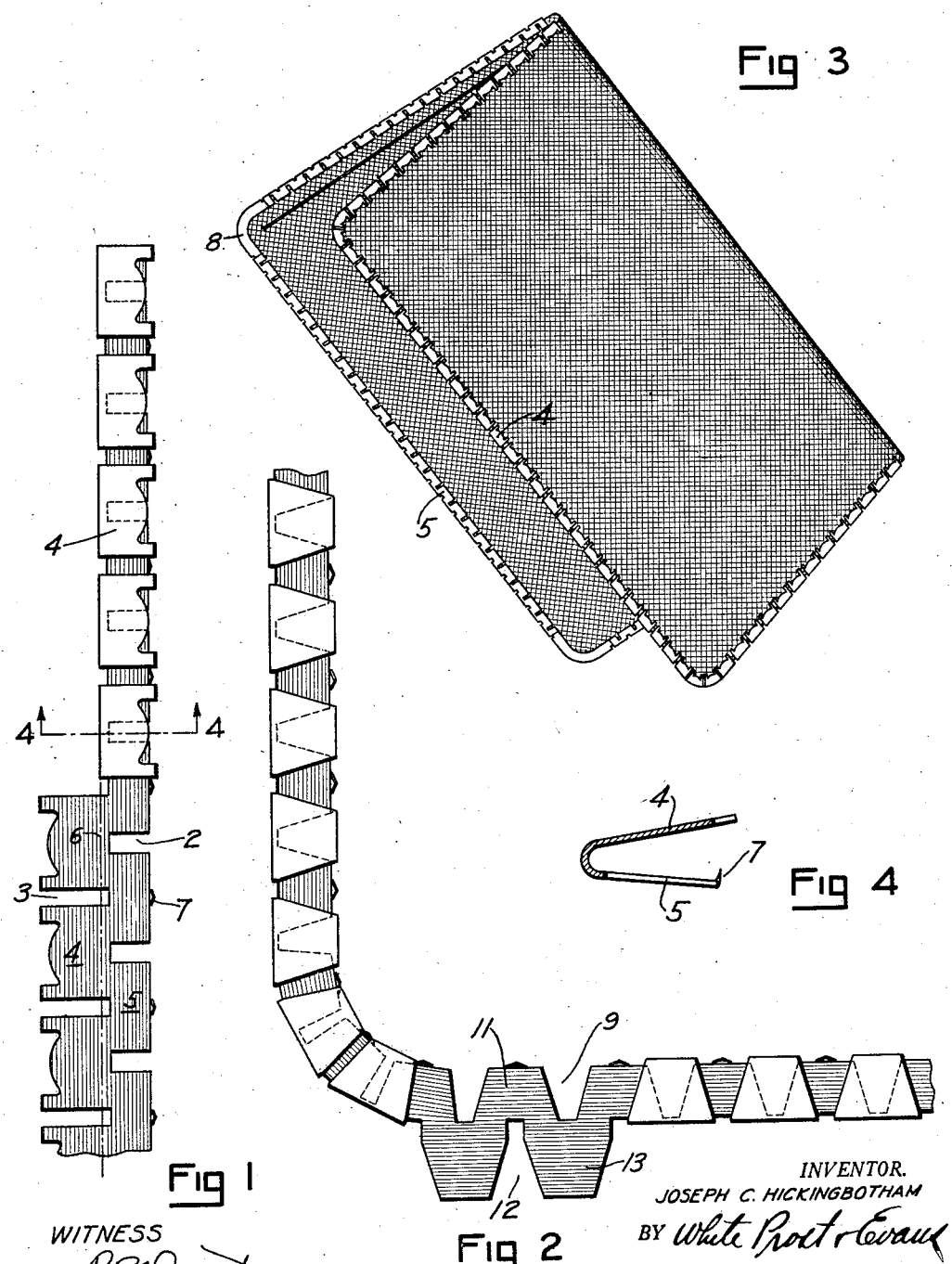

1,601,361

UNITED STATES PATENT OFFICE.

JOSEPH C. HICKINGBOTHAM, OF OAKLAND, CALIFORNIA.

FLEXIBLE EDGING.

Application filed June 13, 1923. Serial No. 645,222.

The invention relates to a flexible edging of particular use in edging or binding leather goods, such as pocket or note books, and one of the objects of the invention is the provision of a metallic edging having a high degree of flexibility and which is characterized by low cost of manufacture and ease of application.

My invention possesses other objects and features of advantage, some of which with the foregoing will be set forth in the following description of my invention. It is to be understood that I do not limit myself to the showing made by the said description, as I may adopt variant forms of the invention within the scope of the claims.

Referring to the drawings: Fig. 1 is a plan view of a piece of my flexible edging, the upper portion of the figure showing the edging folded, and the lower portion of the figure showing the edging flat before folding. Fig. 2 is a plan view of my edging made in accordance with another pattern particularly suitable for application about a corner, or on curved edges. A portion of the figure discloses the edging strip before folding. Fig. 3 is a perspective view of a leather pocket book on which my edging has been applied. Fig. 4 is a transverse sectional view of the flexible edging folded as it is supplied to the trade. The plane of section is shown by the line 4—4 of Fig. 1.

My flexible edging comprises a strip of metal, usually gold or silver, having notches 2 formed in one edge, and notches 3 formed in the opposite edge, so that the strip becomes a series of plates 4 and 5 arranged in staggered linear formation and integrally connected on their sides adjacent their ends. As shown in Fig. 1, the notches 2 and 3 are staggered, and notches 3 extend past the line 6 which represents the line of fold upon which the strip is bent longitudinally. The notches 2, which are formed on the side of the strip which comprises the underside of the edging after its application, do not extend to the fold line, because as a matter of appearance it is not desired to have such notches show from the front of the edging. When the strip is folded, as shown in Figs. 3 and 4, the notches 3 completely separate the plates 4, leaving them, of course, connected adjacent their ends to the underlying plates 5. Thus when the edge of the article is bent, the edging yields with it, the flexture taking place across the plates 5 which lie in the zone affected.

Means are provided for securing the edging to the material on which it is used, and such means preferably constitute teeth 7, integrally formed on the edge of the underlying plates 5.

As supplied to the trade, my flexible edging is in the form shown in Fig. 4, that is folded so that the section is in the form of the letter U. When the edging is applied, as shown in Fig. 3, the two sides are pressed firmly together by any suitable means, so as to clamp the sides upon the material and engage the teeth therein. The teeth together with the clamping effect of the folded strip retain the edging securely in place.

Owing to the relatively narrow notches of the strip, shown in Fig. 1, such edging is not particularly suitable for short turns, and with this edging I supply corner pieces 8, Fig. 3, of a design to harmonize with the straight portions of the edging. In Fig. 2, however, I have shown an edging which may be carried about a corner and this is accomplished by making the notches 9 between the lower plates 11 and the notches 12 between the upper or overlying plates 13 divergent from the fold line outwardly as shown, so that when the edging is applied about a corner the adjacent edges of the plate do not interfere, but lie parallel or nearly so.

My edging may be made in any desired design and lends itself readily to rapid production at low cost. It is quickly and easily fitted and applied, and provides a trimming which protects and supports the edge of the article on which it is used while not detracting materially from its flexibility.

I claim:

1. The combination with a flexible material constituting leather goods products, such as pocket or note books, of a continuous metallic edging attached thereto and comprising a single strip folded longitudinally into substantially parallel portions and having staggered notches in the longitudinal edges thereof extending past the line of fold to impart flexibility to the edging.

2. The combination with a flexible leather sheet constituting leather goods products, such as pocket or note books, of a metallic edging attached thereto and comprising a single strip folded longitudinally into substantially parallel portions and having notches in both said portions, the notches in one portion extending past the line of fold to impart flexibility to the strip substantially equal to that of the leather sheet.

3. The combination with a flexible material constituting leather goods products, such as pocket or note books, of a continuous metallic edging attached thereto comprising a strip folded longitudinally into substantially parallel portions and having notches in one portion extending past the line of fold to impart flexibility to the strip, and teeth formed on said strip for engaging the flexible material.

In testimony whereof, I have hereunto set my hand.

JOSEPH C. HICKINGBOTHAM.